United States Patent [19]

Hurd

[11] Patent Number: 4,664,954

[45] Date of Patent: May 12, 1987

[54] PROCESS FOR FORMING SIMULATED ORNAMENTAL STONE AND PRODUCT THEREOF

[75] Inventor: Richard R. Hurd, Orem, Utah

[73] Assignee: Mountain West Marble & Onyx, Inc., Pleasant Grove, Utah

[21] Appl. No.: 894,321

[22] Filed: Aug. 7, 1986

[51] Int. Cl.[4] .............................................. B32B 27/36

[52] U.S. Cl. .............................................. 428/15; 156/61; 264/71; 428/480

[58] Field of Search .................... 428/15, 480; 156/61; 264/71

[56] References Cited

U.S. PATENT DOCUMENTS

| | | | |
|---|---|---|---|
| 3,773,886 | 11/1973 | Starr et al. | 428/15 X |
| 4,248,816 | 2/1981 | Sheridan | 428/15 X |
| 4,343,752 | 8/1982 | Cann | 264/71 |
| 4,346,050 | 8/1982 | Trent et al. | 264/71 |
| 4,446,177 | 5/1984 | Munoz et al. | 428/15 |
| 4,473,673 | 9/1984 | Williams et al. | 264/71 X |
| 4,499,142 | 2/1985 | Kingston | 428/480 X |

*Primary Examiner*—Henry F. Epstein

*Attorney, Agent, or Firm*—Philip A. Mallinckrodt

[57] ABSTRACT

The conventional process for forming a simulated ornamental stone is improved by using alumina trihydrate as a filler for a polyester or the like resin with catalyzer for depth-simulation, the same being applied as a substantially integral translucent layer of variegated depth substantially coextensive with the superficial veining surface of the product and being backed by a solidly colored material which may include a solidly colored gel coat between the depth-simulating material and back-up matrix material.

10 Claims, No Drawings

PROCESS FOR FORMING SIMULATED ORNAMENTAL STONE AND PRODUCT THEREOF

BACKGROUND OF THE INVENTION

1. Field

This invention has to do with the forming of a simulated ornamental stone, such as marble or onyx, in a mold utilizing a polyester resin or the like along with other materials to provide veining and back-up matrix therefor.

2. State of the Art

Simulated marble has long been produced commercially by a process disclosed by K. A. Starr et al. in U.S. Pat. No. 3,773,886. An improved procedure is disclosed by James C. Sheridan in U.S. Pat. No. 4,248,816. Both procedures use a mold and a polyester resin or the like mixed with a catalyst and various other materials to provide a relatively thin gel coat covering the mold surface, veins superimposed on the gel coat, a layer of spatter superimposed on the veins and providing a multiplicity of voids to provide visual depth, and a back-up matrix to fill the mold. Sheridan uses multiple layers of spatter, one layer covering the voids of another layer to provide increased visual depth. Both mix a volatile solvent, a vinyl monomer, and a rubbery material with the polyester resin for the veins and the spatter, which are sprayed or otherwise made to fall through the air during application, so solvent will evaporate as the material falls into place. A matrix material, again polyester, a catalyst, and calcium carbonate as a filler, is used as an uncolored, opaque back-up material to fill the mold.

Simulated onyx has also been produced commercially using alumina trihydrate as a translucent filler material instead of calcium carbonate.

3. Objective

A principal objective in the making of the present invention was to provide a more realistic synthetic stone product having greater depth of color and an overall more attractive appearance.

SUMMARY OF THE INVENTION

In accordance with the present invention, a more realistic simulation of natural stone having greater depth of color is produced by mixing alumina trihydrate powder with the usual polyester resin and catalyst to provide a synthetic onyx material, which is translucent and may be used both for veining and for a depth-simulating layer of randomly variegated thickness covering the veining. The veining material is colored as desired and applied in any usual manner to a clear, polyester, gel coat previously applied to the mold surface and commonly employed in the art concerned.

A feature of the invention is the spreading onto the gel coated interior mold surface and onto the veining material applied thereto of a layer of the synthetic-onyx-filled resin material, which layer is translucent and has randomly variegated thickness in the range of about one thirty-second of an inch to about one inch, preferably by hand manipulating a spreading tool, such as a trowel or spatula, with respect to at least one bulk quantity of the depth-simulating resin material deposited onto the surface. A few spots of zero thickness will do no harm, but the veined gel coat will be covered by a substantially integral layer of depth-simulating material which is substantially coextensive with the veined gel coat surface.

Filling of the mold to provide a smooth and usually planar back surface for the final product is carried out by either applying a solidly pigmented polyester gel, to a thickness of from about five to about twenty mills over the layer of variegated thickness, with the remainder of the depth of the mold being synthetic onyx matrix material, colored or uncolored, or the usual calcium carbonate matrix material, colored or uncolored, or by leaving out the gel coat and filling the mold completely with solidly colored synthetic onyx matrix material or solidly colored calcium carbonate matrix material. The solidly colored back-up combined with the depth-simulating layer above it in the final product provides a more natural and pleasing appearance of depth than possible heretofore.

For bathtubs or other products requiring structural strength, the solidly colored gel coat over the layer of variegated thickness is used in thickness of about fifteen to about twenty-five mills, the remaining depth of the mold being filled with chopped fiberglass and resin for structural strength.

No solvent of any kind is employed with the polyester resin, or the like, nor is there employed a rubbery material, as is true of the cited patented instances of simulated marble, unless veining is accomplished by spraying as in the Starr et al. patent.

DETAILED DESCRIPTION OF PREFERRED EMBODIMENT

The best mode presently contemplated of carrying out the invention in practice is to mix a batch of matrix material in quantity sufficient to fill the cavity of the mold employed. This is preferably done in a motorized mixer, such as a Hobart bread dough mixer or a Gruber Systems matrix mixer. Alumina trihydrate powder is mixed with a polyester resin or the like and a usual catalyst therefor in a ratio of typically 100 pounds of the alumina trihydrate powder to 30 quarts of the resin and catalyst. While this ratio is preferred, the mix could be made thicker or thinner by increasing the amount of the alumina trihydrate or the amount of the resin. The viscosity of the mix in any given instance will depend upon a variety of factors well known to those skilled in the art. Thus, the amount of catalyst relative to the amount of resin will depend upon the curing temperature of the final product.

After mixing these materials for approximately 5 to 20 minutes, depending upon the RPM of the mixer, particulate titanium dioxide or other pigment, either alone or mixed with liquid resin, in amount sufficient to create any desired color variation is pushed down into the mass of material from the surface, and the mixer is started and run just long enough to effect appropriate distribution of the titanium dioxide particles throughout the mass.

The mold is prepared by cleaning its interior surface and applying thereto wax or other suitable release agent and by spraying or otherwise applying a clear gel coat of polyester resin or the like suitably catalyzed as by the addition of from one to two percent by weight of an appropriate catalyst. When the gel coat has become tacky, veining material is taken from the upper part of the batch in the mixer after coloring an appropriate quantity of the mix by the addition thereto and hand mixing therewith of a desired color pigment, and is applied over typically one to ten percent of the tacky gel coated mold surface. Although this procedure is presently preferred by us, veining material may be applied in any suitable manner well known to those skilled in the art as, for example, by spraying on a colored liquid resin, for desired vein appearance.

Following veining and before gelling of the resin, there is spread over the veined gel coated interior surface of the mold a layer of the matrix material from the mixer. This is unpigmented except for the relatively small quantity of particulate titanium dioxide previously mixed therewith and is spread over the veined, gel coated mold surface in a substantially integral layer having randomly variegated thickness throughout, ranging in depth from about one thirty-second of an inch to about one inch, with few if any bare spots. In applying this layer, it is presently preferred to deposit one or more bulk quantities of the matrix mixture from the mixer and to spread it unevenly by hand-manipulation of a suitable spreading tool, such as a trowel or spatula.

This provides visual depth by reason of the translucent quality of the matrix material, which passes variegated color by reason of its variegated thickness and of solidly colored back-up material which is applied thereover.

This solidly colored back-up material may be either the alumina-trihydrate-filled resin and catalyzed matrix material, which has been solidly colored, or a similar solidly colored calcium-carbonate-filled resin and catalyzed matrix material, but is preferably such a back-up material, colored or uncolored, applied over a solidly colored gel coat of from about 5 to 20 mills thickness that is first applied over the variegated thickness, depth-simulating layer.

When the product is to be used structurally, as in bath tubs, chopped fiberglass and resin are applied over the solidly colored gel coat.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. In a process for forming a simulated, natural, ornamental stone, which comprises applying a gel coat of polyester resin or the like to the interior surface of a mold, depositing a colored veining material on said gel coat to simulate the veins of the natural stone, applying a depth-simulating material over the veined surface of said gel coat, and filling the remainder of the depth of the mold with a back-up matrix material, the improvement comprising mixing particulate alumina trihydrate with a polyester resin or the like and a catalyst therefor to provide translucent depth-simulating material; spreading said depth-simulating material in a substantially integral layer of variegated thickness varying from about one thirty-second of an inch to about one inch over and substantially coextensively with the veining and gel coat prior to applying the back-up material thereto; and using a solidly colored back-up material to effect improved depth appearance for the resulting product.

2. An improved process for forming a simulated ornamental stone in accordance with claim 1, wherein a relatively small amount of particulate titanium dioxide is distributed throughout the depth-simulating material prior to application thereof to the mold.

3. An improved process for forming a simulated ornamental stone in accordance with claim 1, wherein the veining material and the depth-simulating material are devoid of solvent and rubbery material.

4. An improved process for forming a simulated ornamental stone in accordance with claim 1, wherein the back-up material comprises a solidly colored gel coat applied directly over the depth-simulating material.

5. An improved process for forming a simulated ornamental stone in accordance with claim 4, wherein the back-up material further comprises chopped fiberglass reinforcing material mixed with resin and applied over the solidly colored gel coat.

6. An improved process for forming a simulated ornamental stone in accordance with claim 1, wherein the depth-simulating material is applied by depositing at least one bulk quantity of said material onto the veined gel coat surface and hand spreading the deposited material by means of a hand tool.

7. In a simulated ornamental stone product having a gel coat facing, veining below said facing; depth-simulating material below said veining; and back-up material below said depth-simulating material, the improvement wherein the depth-simulating material is an alumina-trihydrate-filled, catalyzed, polyester resin or the like substantially integral throughout, substantially coextensive with the gel coat facing, and of variegated thickness varying between about one thirty-second of an inch and about one inch; and the back-up material comprises solidly colored material.

8. An improved simulated ornamental stone product in accordance with claim 7, wherein the solidly colored material is a solidly colored gel coat immediately behind the depth-simulating material.

9. An improved simulated ornamental stone product in accordance with claim 8, wherein the back-up material includes chopped fiberglass mixed with resin and positioned in back of the solidly colored gel coat.

10. An improved simulated ornamental stone product in accordance with claim 1, wherein the colored veining material deposited on the mold gel coat is a colored alumina-hydrate-filled polyester resin or the like with catalyst.

* * * * *